US 6,570,849 B1

(12) United States Patent
Skemer et al.

(10) Patent No.: US 6,570,849 B1
(45) Date of Patent: May 27, 2003

(54) TDM-QUALITY VOICE OVER PACKET

(75) Inventors: Terry Skemer, Ottawa (CA); Sami Aly, Kanata (CA); Robert W. Brown, Arnprior (CA)

(73) Assignee: Tropic Networks Inc., Kanata (CA)

( * ) Notice: Subject to any disclaimer, the term of this patent is extended or adjusted under 35 U.S.C. 154(b) by 0 days.

(21) Appl. No.: 09/419,471

(22) Filed: Oct. 15, 1999

(51) Int. Cl.⁷ .............................. H04J 3/24; H04L 12/56
(52) U.S. Cl. ............... 370/230.1; 370/352; 370/395.41; 370/412; 370/429; 370/471; 370/477
(58) Field of Search ............................. 370/230, 230.1, 370/252, 253, 351, 352, 389, 395.1, 395.2, 395.21, 394.4, 395.41, 412, 428, 429, 468, 470, 471, 477; 709/232, 234, 235, 238

(56) References Cited

U.S. PATENT DOCUMENTS

| | | | |
|---|---|---|---|
| 4,771,391 A | 9/1988 | Blasbalg | 364/514 |
| 4,825,434 A | 4/1989 | Shaio | 370/80 |
| 4,914,650 A | 4/1990 | Sriram | 370/60 |
| 5,050,161 A | 9/1991 | Golestani | 370/60 |
| 5,130,985 A | 7/1992 | Kondo et al. | 370/94.1 |
| 5,179,557 A | 1/1993 | Kudo | 370/94.1 |
| 5,425,023 A | 6/1995 | Haraguchi et al. | 370/60 |
| 5,526,353 A | 6/1996 | Henley et al. | 370/60.1 |
| 5,553,063 A | 9/1996 | Dickson | 370/29 |
| 5,634,006 A | 5/1997 | Baugher et al. | 395/200.06 |
| 5,706,439 A | 1/1998 | Parker | 395/200.17 |
| 5,751,706 A | 5/1998 | Land et al. | 370/352 |
| 5,751,970 A | 5/1998 | Bournas | 395/200.66 |
| 5,883,891 A | 3/1999 | Williams et al. | 370/356 |
| 5,892,753 A | 4/1999 | Badt et al. | 370/233 |
| 5,910,946 A | 6/1999 | Csapo | 370/328 |
| 6,212,190 B1 * | 4/2001 | Mulligan | 370/400 |
| 6,327,626 B1 * | 12/2001 | Schroeder et al. | 709/236 |

OTHER PUBLICATIONS

Peter Lambert, "Integrated Access Devices Give ATM New Life in Local Loop But Good Old TDM Assures Voice Quality and CLASS Features," posted Apr. 1999, pp. 1–6 http://www.x–changemag. com/articles/941feat1. html.
Susan Biagi, "Make your selection now," Cover Story, Mar. 22, 1999, pp. 1–7, http://www.internettelephony.com/archive/3.22,99/cover/cover.htm.
NetPoint Corporation, "NetPoint—Connecting the Last Mile," pp. 1–3, http://www.netpointcorp.com/corp_info.html.

* cited by examiner

Primary Examiner—Alpus H. Hsu
(74) Attorney, Agent, or Firm—Victoria Donnelly; Anne Kinsman

(57) ABSTRACT

A method of transmitting interleaved real-time and non-real-time data on a packet based network so as to provide voice Quality of Service comparable to the Time Division Multiplexing realm of traditional telephony. The method reduces packet jitter and delay by employing separate queues for the different types of data as well as through the use of jitter buffers. The interleaving method consists of a number of discrete concepts and mechanisms that when used together in the manner disclosed herein provides consistent high-quality transmission of real-time data over packet/frame/cell-based networks. The elements required for this method include time-slot co-ordination, a dynamic MTU algorithm, and a Multiple queue egress traffic management system.

16 Claims, 4 Drawing Sheets

| Packet Size (bytes) | Link Speed (Kbit/sec) | | | | | |
|---|---|---|---|---|---|---|
| | 384 | 512 | 1000 | 1500 | 2000 |
| 50 | 1.042 | 0.781 | 0.400 | 0.267 | 0.200 |
| 100 | 2.083 | 1.563 | 0.800 | 0.533 | 0.400 |
| 200 | 4.167 | 3.125 | 1.600 | 1.067 | 0.800 |
| 300 | 6.250 | 4.688 | 2.400 | 1.600 | 1.200 |
| 400 | 8.333 | 6.250 | 3.200 | 2.133 | 1.600 |
| 500 | 10.417 | 7.813 | 4.000 | 2.667 | 2.000 |
| 750 | 15.625 | 11.719 | 6.000 | 4.000 | 3.000 |
| 1000 | 20.833 | 15.625 | 8.000 | 5.333 | 4.000 |
| 1250 | 26.042 | 19.531 | 10.000 | 6.667 | 5.000 |

Figure 4

TDM-QUALITY VOICE OVER PACKET

FIELD OF INVENTION

This invention deals with the interleaving of data streams of differing priorities in such a manner that real time data can be delivered on a managed packet-based network in real time, while non-real time data is delivered in the bandwidth remaining after the real time data has been transmitted.

BACKGROUND

Historically, entire separate communications systems have been employed to transmit audio data, traditionally referred to as "voice", and computer data, conveniently referred to as "data", although at present audio data and computer data both are considered to fall within the broad definition of "data". Over a century ago analogue telephone networks were developed to carry analogue audio signals. Telephone networks allow communication of audio signals between two or more users by establishing, with central switching equipment, a temporary dedicated communication circuit or channel between the users. Because the channel, once established, is dedicated exclusively to the transmission of signals between the users, the signals are not required to compete for the channel's bandwidth with other unrelated signals. The advantage of having a dedicated channel for a voice conversation is that any transmission delay from speaker to listener is purely a function of the unfettered speed of the audio signal through the telephone network. Since this speed does not significantly vary over time, such dedicated channels are capable of providing isochronous transmission. Unfortunately, one significant disadvantage of dedicated channels is that they require significant bandwidth; that is, the complete bandwidth of the channel remains available and dedicated to carrying the conversation even when no information is being transmitted, such as during either conversational or inter-syllable pauses. To allow better utilisation of a given communication link, time-division multiplexing (TDM) systems, where voice signals from a number of users are digitised and then the resulting bits are time compressed for transmission over the same link. This scheme also provides isochronous transmission while sharing the communication link.

In contrast, more recent packet transmission systems are asynchronous, allowing the allocation of bandwidth on an as-demanded basis. For instance, if a channel is highly active, it may receive more than its pro-rata share of overall bandwidth. When a channel's activities decline, its allocated bandwidth likewise declines. Thus, packet transmission is adept at handling "bursty" transmission of data, wherein the activity of each individual channel is subject to relatively wide variation.

All networks experience certain delays in end-to-end data transmission therethrough, this delay (termed "latency") affects the overall efficiency and effective bandwidth of the network. Packet-based computer networks, because they are asynchronous, are further subjected to "jitter", defined as a change in the latency of the network as a function of time. Jitter is largely unpredictable; however, the overall quantity of traffic on a network tends to increase both latency and jitter. Jitter can only be corrected by ensuring constant latency, or by developing methods to compensate for its effects. The most common of these methods is the use of a "jitter-buffer" to store incoming data, thus hiding jittery transmissions from the listener.

Given the ongoing rapid growth of data traffic compared with the slow growth of voice traffic, it is foreseeable that the volume of data traffic will outstrip that of voice on public carrier networks. At that point, the existing Public Switched Telephone Network (PSTN), whose technology is primarily based on circuit switching, will be used predominantly to carry data for which a packet switching technology is a more appropriate alternative. Packet-switched networks can carry voice calls using as little as 8 kilobits per second (Kbps) of bandwidth to provide TDM quality voice compared to the 64 Kbps that is reserved for each call in the conventional PSTN. The potential increase in capacity is attractive to telecommunications service providers, as are the reduced infrastructure costs associated with building packet-switched networks. As a result, providers of new real time telephony services are increasingly using packet- switched network architectures, a trend that will continue with the arrival of competition in the local phone market. The predominant packet-based network protocol in use today is the ubiquitous Internet Protocol (IP). The first attempts to use this technology were implemented by hobbyists on the Internet. In these early methods, an Internet telephony software program would convert the user's analogue voice signal to digital data, compress it, and transmit it as packets to an Internet server. For example, a full duplex real time telephone conversation may be initiated over the Internet from one computer to another. Both computers generally require the same Internet telephony software, a microphone, a sound card, a minimum processor speed, a modem, specific software, and a connection to an Internet Service Provider. Both computers must be on-line simultaneously; which requires either a pre-arrangement between callers or a separate telephone toll call. Software for that type of system is commercially available.

Data packets traverse packet based networks by being routed from one node to the next. Each of these hops takes the packet closer to its destination. Each node along the route is designated by a globally unique address. Each node in the route looks at the destination address contained in the header of a packet and sends the packet in the direction of its destination. At any time, a node along a particular route can stop accepting, or block one or more packets. This may be due to any number of reasons: congestion, maintenance, node crashes, etc. Each routing node constantly monitors its adjacent nodes and adjusts its routing table when problems occur. As a result, sequential packets often take different routes as they traverse the Internet. The audio quality of duplex phone conversation over the Internet is often poor because of delays of transmission of packets, lost packets, and lost connections. The delays are unpredictable and are usually caused by the dynamically changing conditions of the network and the changing and often long routes through which packets must pass to arrive at their destination. One consequence of these delays and differing routes the packets follow, other than message lag, is that individual voice packets may arrive in a non-sequential order.

Existing methods for reducing delay-related problems include assorted error correction schemes, primarily repeat codes, which transmit data packets multiple times, and parity codes, which use modulo arithmetic to achieve a fixed value over a series of cells in a check accumulator. These techniques are well known in the art, as are their drawbacks. The use of repeat codes is undesirable because of the network resources wasted by sending multiple copies of a single packet. Parity codes are hampered by implementation problems that make both source encoding and destination decoding complicated. A simple "row-parity" scheme can be employed easily by placing parity packets after a set number of packets, but is flawed because it can only be used to correct an error if the receiver knows that all but one packet has been received correctly. More complex schemes, such as the one outlined in U.S. Pat. No. 5,883,891 use a "matrix-parity" concept which seeks to improve the audio quality of voice communication over the Internet by reconstituting delayed and/or missing packets based upon the packets that arrive in time. The system is "robust", in comparison to simpler row-parity schemes, because packets constituting the matrix are deliberately transmitted over multiple routes. If one route is subject to delays, or packet loss, the lost or delayed packets can be fully reconstituted in many cases. The system receiving the voiceband signal from a caller (host system) uses a software program, which arranges each set of incoming voice packets into a two or three dimensional matrix. For example, a matrix could consist of five rows and five columns for a total of twenty-five packets. A sixth row, composed of check packets and based upon the five packets in its column is added as is a sixth column whose elements are check packets based upon the rows of the matrix. The source node transmits the packets over an IP network, such as the Internet, to a destination node which performs the necessary parity check operations to determine the values of missing and/or delayed packets. If the decoding system is sufficiently fast, the effect, to the listener, is as if all the packets had arrived on time. The listener hears a replica of the entire original voice.

Though parity schemes such as these are more effective than repeat codes, they introduce additional complexity in both the encoding and decoding processes, and still cannot guarantee a quality of service equivalent to that of TDM telephony due to the inherently unpredictable nature of overly used, highly congested, public data networks such as the Internet.

Packet-switching techniques typically involve variable and arbitrary delays, which are unacceptable for two-way communication involving real time signals. The human ear is critically sensitive to absolute delay greater than about 200 ms. The ear is also critically sensitive to random delays or gap modulation, as well as to minute tones, inflections and pauses, particularly in human speech. Thus, a computer data network that must also transmit audio data is forced to cope with the communication of both bursty computer and time-sensitive audio data on the same backbone.

These problems are compounded by call set-up difficulties that arise from an inability to pick an ideal transmission block size. This size is dependent upon numerous factors which include channel capacity, congestion, and data sources. Any packet that is larger than a maximum transmission unit (MTU) must be segmented, which introduces excessive overhead if the MTU is smaller than the majority of data packets from the source. If the MTU is too large on a congested channel, then excessive delays are introduced when non-real-time data is being transmitted and a real-time data packet is waiting for transmission. Thus the establishment of an MTU suitable for network transmission is important to systems that simultaneously contain real-time and non-real-time data packets.

One method of determining the optimal MTU that is known in the art is to determine the maximum packet size that the path in the network between the two nodes can reliably transmit by interrogating the nodes that are passed in transit as to their capacity, and picking a packet size that is as large as the smallest capacity of any node in the route taken through the network. This method is overly restrictive as a result of the fact that the MTU is unable to change in response to dynamic bandwidth fluctuations. In addition to this drawback, the interrogation of a system with high latency can adversely impact upon the time needed to establish a connection (i.e. an increase in the time required for handshaking).

Because the MTU is the largest size a packet can be in a given network, it is common in the art to use the MTU as the segment size for the transport layer for transferring large files. This practice results in a large overhead cost at the host system where the large file is stored. Not only does each segment require substantial overhead when transmitted but each acknowledgement of the transmitted segments effectively doubles the overhead since the overhead per segment is constant regardless of the size of the data transfer.

There has been a universal reluctance to increase the segment size above the network MTU and divide the segments into two or more fragments. This reluctance stems from the fact that transmission protocols such as TCP/IP retransmit the entire segment if any fragment is lost or encounters an error, thus rendering the apparent savings at the host system of questionable value since the network communication processing costs rise as the segment size increases due to retransmission of entire segments when a single fragment is lost or is in error.

An improved MTU determination scheme is outlined in U.S. Pat. No. 5,751,970. This patent outlines a process for determining and selecting an optimum segment size for transferring data across a network. In this method, the cost of transferring a segment equal in size to the MTU is sequentially compared to the cost of transferring segments which are integer incremented multiples of the MTU. When the comparison indicates that the cost of the incremented segments exceeds the cost of transferring the segment equal in size to the MTU, the sequential comparison is halted, and the segment size derived in the previous calculation is used for transferring the data. To do this calculation, an iterative procedure may be used or an approximate value can be calculated if certain characteristics of the network are known. Though using this non-iterative solution addresses the problem of increased handshake time that exists with both channel interrogation and an iterative approach, it does not accommodate changing network conditions. The changes in network conditions undermine the calculation of the MTU multiplier, causing the system to yield a suboptimal segmentation size.

One problem not addressed by methods common in the art is that the system parameters vary in real time in a non-deterministic manner. Prior art treats network communications as either static or varying with time in a deterministic fashion. Network unpredictability is the result of stochastic processes that cannot be properly modelled. These unpredictable effects must be compensated for to achieve TDM Quality of Service (QoS) in a packet-based network.

As a result of industry's desire to achieve TDM quality voice transmission the focus of attention has shifted from Internet telephony (carrying voice calls over the Internet) to IP telephony or Voice-over-IP (VoIP) using other IP networks, especially private network backbones. In its broadest sense, this is a move to packet based telephony, commonly called Voice over Packet (VoP), on private networks which has been prompted, in large part, by the need to guarantee a minimum level of connectivity bandwidth, while reducing congestion problems. The second benefit of this private network approach is that it affords a greater ability to predict network conditions, and to identify points of probable congestion.

Additionally, with a private network, it is possible to prioritise packets derived from real-time sources such as voice transmissions (henceforth referred to as voice packets) over packets derived from computer based information sources (henceforth referred to as data packets) utilising a queuing scheme. The Internet generally is unreliable for high quality voice telephony because the TCP/IP protocols currently do not provide for reserving bandwidth to guarantee QoS. Thus, the quality of VoIP calls is adversely affected by unpredictable network congestion that can cause packet delays or losses. For these reasons environments such as the public Internet or another public packet network, which are marked by dramatic and uncontrollable fluctuations in load, cannot guarantee an acceptable voice connection. Private networks, using either IP or another packet oriented protocol, can provide high quality voice services because their traffic can be managed to a higher degree.

This ability to assign higher priority to a particular type of packet is termed Grade of Service (GoS) in the art. Though present implementations are an improvement over standard, unprioritised IP, they are not as effective as the TDM-world's QoS guarantee, because GoS is only a relative guarantee. In effect GoS says that it will transmit one type of packet ahead of another, but is limited in both the number of grades available and in its ability to guarantee that a packet, of any grade, will be reliably received. In comparison QoS is an absolute and quantifiable guarantee, which is able to deliver higher priority packets over lower priority ones. This obstacle, along with several others, is overcome by the present invention.

SUMMARY OF THE INVENTION

It is an object of this invention to provide a solution to the above mentioned obstacles by providing a method of communicating Voice over IP (VoIP) gateways that provides voice Quality of Service (QoS) comparable to the Time Division Multiplexing (TDM) realm of traditional telephony. The method is primarily concerned with reducing packet jitter and delay at the launching gateway.

It is another object of this invention to have the jitter and delay introduced at the launching end compensated for at the receiving gateway by mechanisms such as a jitter buffer.

It is yet another object of the invention to have the launching gateway reduce impairments due to limitations in the jitter buffer size to negligible amounts. The reduction of jitter provided for herein aids in allowing TDM-Quality service using packet based transmission networks.

It is yet another object of this invention to provide a method of interleaving other types of real-time data, such as facsimile or video, with non-real-time data over a stream of mixed data units, such as packets, that combine both types of data while giving a higher priority to the real-time data.

The interleaving method disclosed herein consists of a number of discrete concepts and mechanisms that when used together in the following manner provides consistent high-quality transmission of real-time data over IP or other packet/frame/cell-based networks. The elements required for this method include:
1. Time-slot co-ordination
2. Dynamic MTU algorithm
3. Multiple queue egress traffic management system (e.g., high/low priority queues or real-time/non-real-time queues) that is synchronised with the co-ordination of time slots.

Time-slot co-ordination is a concept that is novel in packet based networks, though it is well used in the TDM environment.

TDM-Quality Voice over Packet is particularly intended for those situations where QoS must be provided to support real-time applications such as voice or video.

It is an object of the present invention to provide a communication system for interleaving non-real-time data (NRD) and real-time data (RTD), said RTD representing at least one of n analogue signals, each signal received from at least one of n calls, for transmission over a data network, having a predetermined network bandwidth, said system comprising four elements. The first element is a non-real-time queue for receiving the NRD. The second element is a real-time queue for receiving the RTD. The third element is a network interface responsive to the non-real-time queue and the real-time queue for combining a maximum transmission unit (MTU) that contains a segment of the NRD, with a real-time window (RTW) that contains a segment of the RTD, into a launch window having a predetermined launch interval. The fourth element is an MTU calculation unit for determining a permissible size in bits for the MTU equal to at most the launch window size minus a size for the RTW suitable to permit a synchronised transmission of said RTD within the launch interval based on the network bandwidth. One aspect of the current invention is to provide a communication system, as described above further comprising fragmentation means responsive to the MTU calculation unit for fragmenting the NRD into a plurality of data fragments, each fragment having a size suitable for fitting within one of a corresponding plurality of MTUs. Another aspect of the current object of the invention is to provide a communication system as described above, wherein the launch window has a size in bits equal to the product of the launch interval in seconds and the network bandwidth in bits per second. A further aspect of the current invention is a communication system as described above, wherein the RTW has a size in bits equal to a predetermined number of protocol overhead bits plus a product of n, a pre-selected call density coefficient and a pre-selected block size in bits. Yet another aspect of the current invention is a communication system as described above, wherein each one of the n calls has a respective call density coefficient (CDC) and a respective block size, and wherein the RTW has a size in bits equal to a predetermined number of protocol overhead bits plus a sum of n products corresponding to the n call, each product obtained by multiplying the respective CDC and the respective block size in bits of each one of the n calls. Another aspect of the current invention is a communication system as described above, wherein the at least one of the n calls carries a voice signal. Another aspect of the current invention is a communication system as described above, wherein the at least one of the n calls carries a facsimile signal. Another aspect of the current invention is a communication system as described above, wherein the at least one of the n calls carries a video signal.

Another object of the current invention is a method of interleaving non-real-time data (NRD) with real-time data (RTD) representing analog signals from at least one of n calls, into a combined data stream, to be transmitted over a data network having a predetermined bandwidth, said method comprising the following three steps. The first step is the receiving and queuing the NRD. The second step is the receiving and queuing the RTD. The third step is the filling of a segment of the RTD into a real-time window (RTW) to form a first part of a launch window having a pre-selected size and a predetermined launch interval, wherein the RTW has a size suitable to permit a synchronised transmission of the RTD within the launch interval based on the network bandwidth. The fourth step is the filling of a segment of the NRD into a maximum transmission unit (MTU) to form a second part of the launch window, wherein the MTU has a size equal to at most the launch window size minus the RTW size. One aspect of this object of the invention is an interleaving method as described above, further comprising the step of fragmenting the NRD into a plurality of data fragments, each fragment having a size suitable for fitting within one of a corresponding plurality of MTUs. Another aspect of the current invention is an interleaving method as described above, wherein the launch window has a size in bits equal to the product of the launch interval in seconds and the network bandwidth in bits per second. Yet another aspect of the current invention is an interleaving method as described above, wherein the RTW has a size in bits equal to a predetermined number of protocol overhead bits plus a product of n, a pre-selected call density coefficient and a pre-selected block size in bits. Yet a further aspect of the current invention is an interleaving method as described above, wherein each one of the n calls has a respective call density coefficient (CDC) and a respective block size, and wherein the RTW has a size in bits equal to a predetermined number of protocol overhead bits plus a sum of n products corresponding to the n call, each product obtained by multiplying the respective CDC and the respective block size in bits of each one of the n calls. Another aspect of the current invention is an interleaving method as described above, wherein the at least one of the n calls carries a voice signal. Another aspect of the current invention is an interleaving method as described above, wherein the at least one of the n calls carries a facsimile signal. Another aspect of the-current invention is an interleaving method as described above, wherein the at least one of the n calls carries a video signal.

BRIEF DESCRIPTION OF THE DRAWINGS

Exemplary embodiments of the invention will now be further described with references to the drawings in which same reference numerals designate similar parts throughout the figures thereof, and wherein:

FIG. 4 shows the serialization time (milliseconds) for packets of various sizes onto access network links of various speeds.

DETAILED DESCRIPTION OF THE INVENTION

Figure 1:
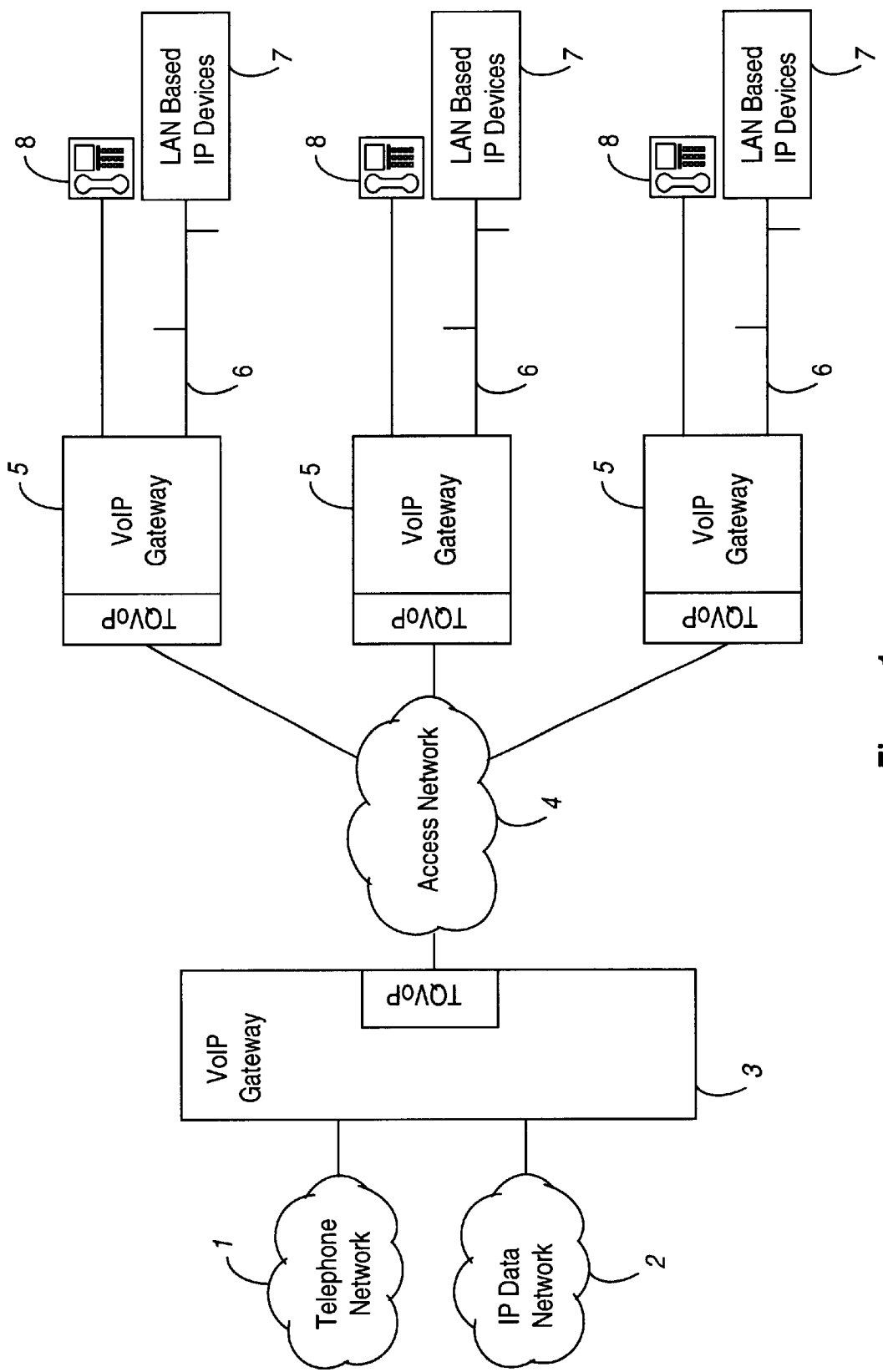
FIG. 1 illustrates an exemplary network configuration that accommodates a TDM Quality Voice over Packet system in accordance with this invention.

FIG. 1 illustrates one of several possible network configurations to which embodiments of this invention are applicable. A conventional Public switched telephone network 1 shown as a cloud is the interface to a circuit-switched voice network. A public data network 2 is any one of a private enterprise network, an Internet Service Provider (ISP) network, or another Public Data Network (PDN). Both the telephone network 1 and the IP data network 2 connect to a service provider's Voice over IP (VOIP) Gateway 3, which is provided by a service provider such as a local exchange carrier (ILEC) or a competitive local exchange carrier (CLEC). The VoIP Gateway 3 is responsible for converting telephony and other voice-band signals and signalling information into IP packets, which are interleaved with user non-real-time IP traffic and sent to other VoIP gateways 5 over an access network 4, which is an established packet based network. Examples of such a packet-based network include those using Internet protocol (IP) or another packet-based protocol such as Frame Relay or ATM.

The VoIP gateway 3 in turn uses its TDM Quality Voice over Packet process (TQVoP) to interleave the information from both the telephone network 1 and the data network 2 for transmission over the access network 4. The access network 4 is a managed network whose throughput and latency characteristics are known. This access network 4 typically incorporates Layer 2 technologies, has sufficient bandwidth, and is planned and managed by the respective service provider. Examples of delivery channels used within the access 4 include digital subscriber lines (xDSL), that are either asymmetrical (ADSL) or symmetrical DSL (SDSL), cable modems, and dedicated T1 or DS1 lines.

The access network 4 terminates in other VoIP gateways 5 at the client site. The TQVoP process of the client site's VoIP gateway 5 allows the connection of the access network 4 to both the private IP network 6 including a group of LAN based IP devices 7 of the service subscriber, and to a private telephone network 8, such as a Private Branch Exchange (PBX). The service subscriber is likely to use telephone sets 9 and/or PBXs (not shown) for voice access. Telephone devices 9 and other voice-band devices (e.g., modems, FAX, etc.) connect to the VoIP gateway via an analogue telephony interface.

Figure 2:
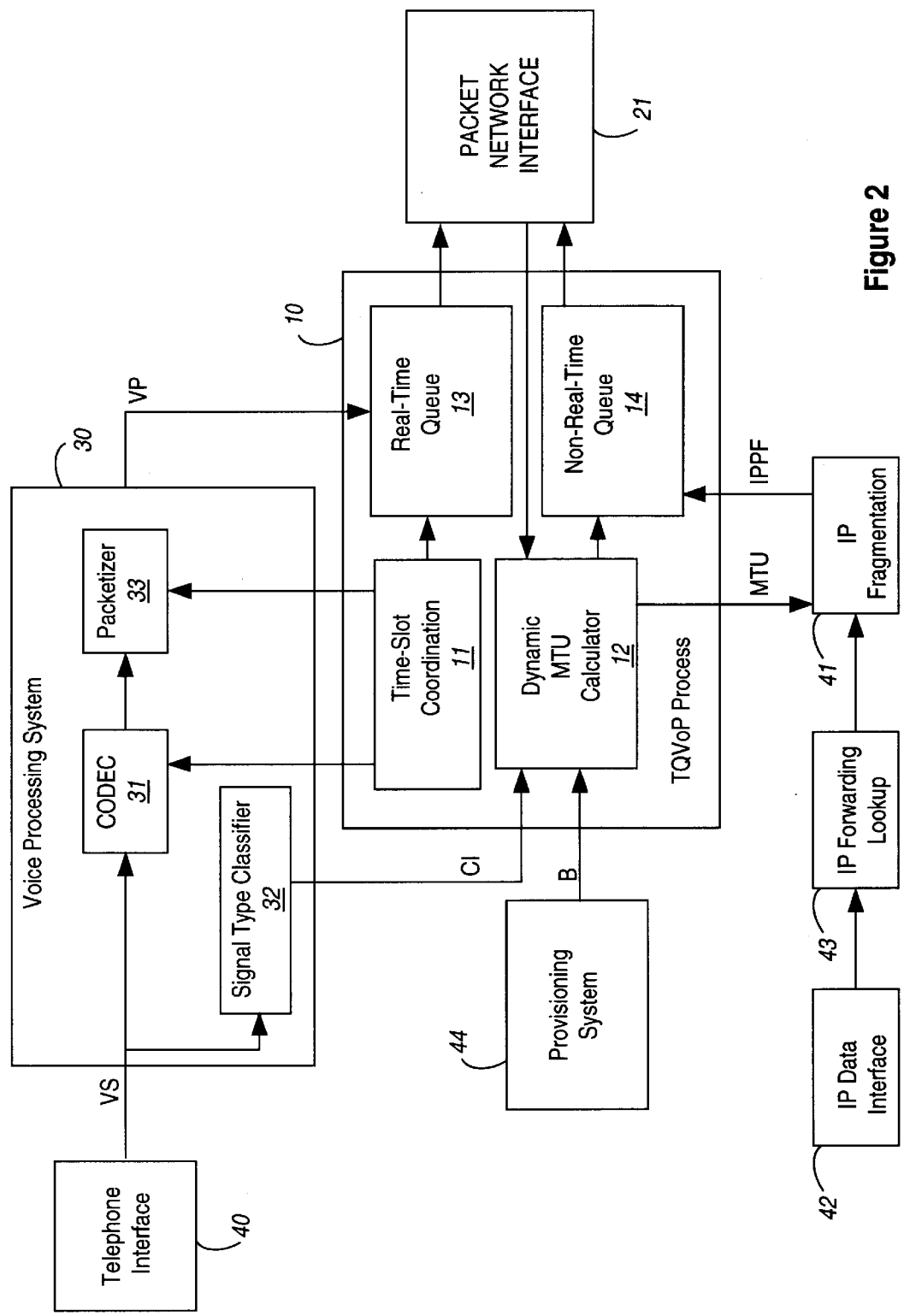
FIG. 2 illustrates in a schematic block diagram a Voice over IP Gateway that accommodates a TDM Quality Voice over Packet system in accordance with this invention.

FIG. 2 illustrates a Voice over IP Gateway that accommodates a TDM Quality Voice over Packet (TQVoP) system 10 in accordance with this invention. This TQVoP system 10 can be implemented with any packet based communications protocol. However, in the following we shall describe an embodiment of the TQVoP 10 to be implemented with the ubiquitous Internet protocol network. Here, the system performs the following processes:

1. A time-slot co-ordination process 11 synchronises the creation of voice packets to be fitted within a mixed data unit that is launched in a launch interval of a pre-selected duration, such that voice packets are created and are ready to transmit immediately before the next-scheduled launch.
2. A dynamic IP MTU process 12 calculates an optimum maximum transmission unit (MTU) value for the non-real-time data (NRD) portion of the mixed data unit that is provided to an IP forwarding or routing subsystem.
3. An egress traffic management process (not shown) interleaves voice-band (real-time) data packets and LAN-based (non-real-time) data packets. This process includes a priority queuing mechanism on the egress interface to prioritise real-time over non-real-time data. At least two egress queues are required. In this exemplary embodiment, two queues are used; A high priority queue 13 is reserved exclusively for real-time data packets. An interface handler 21 always empties this queue first. A second normal priority queue 14 is used by all other non-real-time data types (e.g., LAN-originated, OAM&P, signalling, etc) and is only serviced if the high priority queue 13 is empty.

For the purposes of this description a time slot is defined in units of time, rather than in terms of a data block length. The start of every time slot is used for the real time data that is waiting, and then, if any space is left in the time slot, non-real time data is taken until the next time slot starts. In this process, real-time (voice) packets are created by packetising the digital samples received from an analog-to-digital converter, in this case a CODEC 31, in time to be sent at the start of the next launch window before the delay reaches an unacceptable length. Thus, a mixed data unit combining real-time and non-real-time data is transmitted within the launch window during a pre-selected launch interval. The launch window contains a real-time window and the MTU.

The Dynamic MTU process 12 is defined in terms of an algorithm expressed through the mathematical formulae used to calculate the MTU value, as follow.

$$MTU_{(bits)} = Launch\ Window_{(bits)} - Real\ Time\ Window_{(bits)} \quad (1)$$

where $$Launch\ Window_{(bits)} = Launch\ Interval_{(seconds)} \times End\text{-}to\text{-}End\ Bandwidth_{(bits/second)} \quad (2)$$

$$Real\ Time\ Window_{(bits)} = Fixed\ Protocol\ Overhead_{(bits)} + \sum_{i=1}^{n}(Call\ Density\ Co\text{-}efficient_i \times Voice\ Block\ Size_i) \quad (3)$$

The individual components in the above algorithm are defined as follows:

a) The Maximum Transmission Unit (MTU) defines the largest size of a packet that can be carried by an interface protocol in the communications protocol. If a packet to be transmitted is larger than the MTU listed in the IP Forward Table at a given network node, the packet is fragmented, by an IP fragmentation process 41, in such a way that no individual fragment is larger than the MTU. The MTU value is determined by subtracting the portion of launch window consumed for the real-time window, from the total available launch window. The result is then rounded up to a multiple of the basic packet size and given to a Forward Table. For purposes of an IP network, the MTU is rounded up to the nearest multiple of 64.

b) The Launch Interval is an arbitrary time interval chosen to loosely correspond to CODEC sample collection times. For purposes of this exemplary embodiment, the synchronised launch interval is assumed to be 10 ms.

c) The launch window is the interval between voice launch slots (in bits). To define the launch window in units of bits, the launch interval is multiplied by the bandwidth (in bits/sec). The end-to-end bandwidth is used for the calculation.

d) End-to-end bandwidth is the link speed (in bits/second) of the slowest connection between two nodes in the path between the originating and destination nodes. This is determined by the customer access link or virtual circuit (VC) within the access network. Its value is preferably derived from the speed of the egress interface serial link. Alternatively, a provisionable value is used.

e) The real-time window is the sum of the fixed protocol overhead of the voiceband data-containing packets and the probable traffic expected from each of the active voice-band calls.

f) The fixed protocol overhead is the total number of bits consumed by protocols operating at the Data Link Layer 2 (e.g. Asynchronous Transfer Mode (ATM), Point-to-Point Protocol (PPP), Frame Relay, Ethernet, etc.), the Network Layer 3 (e.g., IP, Internetwork Packet Exchange (IPX), Connectionless Network Service (CLNS), etc), the Transport Layer 4 (e.g. Transmission Control Protocol (TCP), User Datagram Protocol (UDP), TP-4, etc.), and the Session Layer 5 (e.g., Real Time Protocol (RTP), Real Time Control Protocol (RTCP), etc.).

g) The number of set-up calls n is a whole integer value supplied by the Voice Processing Subsystem that corresponds to the number of active voice-band calls. The Voice Processing Subsystem is required to notify the TQVoP system upon any call set-up or teardown.

h) The Call Density Coefficient (CDC) is a measure of the probability that a particular voice-band call will be actively transmitting. In other terms, it is the probability that the particular call CODEC will have a real-time packet ready to transmit. As an example, a CDC of 0.5 means that this call will be silent 50% of the time, implying that this call has a 50% chance of having to send data at any given launch time. The following sample CDC's are given just as examples, which can be used in a preferred embodiment: speech transmission 0.5; MODEM transmission 1.0; Dial Tone 1.0; Dual Tone Multi-Frequency (DTMF) transmission 1.0; Facsimile Inband transmission 1.0; Facsimile Relay Transmission 0.8. Preferably, CDC values must be based on actual usage patterns and other historical data, wherever possible.

The CDC is preferably provided by the Voice Processing System for each call based on the signal type derived from the Signal Type Classifier. Alternatively, a Provisioning System, based on engineering/administrative policy is used for all calls. The CDC has a decimal value that ranges between 0 and 1.0.

The MTU algorithm described above allows per-call management by affording each virtual channel distinct characteristics, where each real time transmission is given a distinct CDC. This is a rigorous method, but it does add to the computational complexity of the algorithm. In a simpler alternate embodiment using a simplified algorithm of the dynamic MTU algorithm, an in depth per-call management system is used. In such an alternate embodiment, one CDC is applied to all calls evenly. This way, the per-call management of activity is eliminated by making assumptions on an entire group of active calls. To do this equation (3) is replaced by a simpler equation ($3_s$):

$$Real\text{-}Time\ Window_{(bits)} = Fixed\ Protocol\ Overhead_{(bits)} + \begin{pmatrix} Number \\ of\ Setup \\ Calls \end{pmatrix} \times \begin{pmatrix} Call \\ Density \\ Coefficient \end{pmatrix} \times \begin{pmatrix} Voice \\ Block \\ Size \end{pmatrix} \quad (3_S)$$

In the simpler algorithm, a typical CDC value of 0.6 is preferred for most types of traffic. This implies a 60% probability that a voice-band call will have data waiting to launch when serviced by the egress bandwidth management process. The CDC is changeable through provisioning, and should preferably be derived through the use of statistics arising from network traffic studies.

In a hardware embodiment of the present invention, the VoIP gateways 3 and 5 shown in FIG. 1 have their hardware designed for performing the process described above. FIG. 2 illustrates the function of the VoIP gateway in the form of a block diagram. A Voice Processing System (VPS) 30, containing a CODEC 31, a Signal Type Classifier (STC) 32 and a packetiser 33, is employed to interpret a voice-band signal VS, which is from a Telephony Interface 40. The voice signal VS is used as an input to both the STC 32 and the CODEC 31. The STC 32 analyses the incoming voice signal VS and determines the number of calls contained, and the CDC of each call. This call information is sent to the TQVoP block 10 as signal CI. The voice signal VS is digitised by the CODEC 31 and sent to the packetiser 33, where a streaming binary signal representing the real-time data of VS is packetised. The packetised real-time data, and the call information CI derived in the STC 32 are both sent to the TQVoP Process 10.

The IP Data Interface 42 provides non-real-time IP packets to the IP Forwarding Lookup Unit 43, where the destination of IP packets is planned as an orderly grouping of hops through the network. The IP Forwarding Lookup places the routing information needed into the header of the IP packets and forwards them to the IP Fragmentation Unit 41. The IP Fragmentation Unit 41 uses the MTU calculated in the TQVoP 10 process' MTU Calculator 12 to fragment the IP packets as needed before sending them to the TQVoP 10. A Provisioning System 44 is optionally used to specify available bandwidth on the access network and relays a signal B to the TQVoP process 10 to facilitate this. The TQVoP Process 10, comprising a Time-slot Co-ordination unit 11, a Dynamic MTU Calculation unit 12, and both real time 13 and non-real time 14 queues, receives information from several different sources, and outputs information to several units. Signals CI, B and B' (a bandwidth measure provided by the Packet Network Interface 21) are used as input to the Dynamic MTU Calculation (DMC) Unit 12. The DMC unit 12 provides a signal, MTU, to the IP Fragmentation Unit 41, that is used to determine the maximum size that an IP packet can be for transmission, if the packet is larger than the determined maximum, it is fragmented into pieces no larger than the MTU. The Time-slot Co-ordination Unit 11 allows the synchronisation of the CODEC 31 and the packetiser 33 with the Real Time Queue 13, so that packets are prepared for launch near the start of the launch window time frame, so that there is negligible delay introduced to their transmission. The Real-Time Queue 13 accepts the signal VP from the VPS's packetiser 33, which contains the real-time packets that comprise the digitised version of signal VS. The Non-Real-Time Queue 14 accepts input from the IP Fragmentation unit 41 (signal IPPF), which contains either IP packets or fragments of IP packets. The TQVoP process 10 unloads the Real-Time Queue 13 at the start of the launch window, and only turns to the Non-Real-Time Queue 14 when the Real-Time Queue 13 is emptied. These two queues deliver their contents to the pace Network Interface 21 (PNI), which facilitates the transmission of the interleaved data stream to the packet network.

The following specific example is presented for the purpose of explanation, and should be considered to be neither limiting in the scope of the invention, nor should it be considered the only embodiment envisioned. For ease of understanding references are made to elements of both FIG. 1 and FIG. 2.

The VoIP gateways 3 transmit packets containing real time traffic at regular, well-defined launch intervals. Due to the real-time nature of this traffic an egress traffic management system (not depicted) is used to ensure that real time packets are given the highest priority on the access network 4. The intervals between the high priority bursts of real time packets define the remaining time window available to other types of data packet traffic.

Depending upon the speed (expressed in Kbits/sec) of the access network link 4, the remaining time window defines the maximum size that other data packets can be transmitted at without introducing either jitter or delays to the real time packets. Packets that are too large to fit into the time remaining in the available window are either delayed until the next available window, or if the packet is too large to fit into the largest possible window, it is fragmented before transmission. The dynamic MTU algorithm 12 determines the size of the fragments.

FIG. 4 provides the serialisation time (in milliseconds) for packets of various sizes onto access network links of various speeds.

Figure 3:
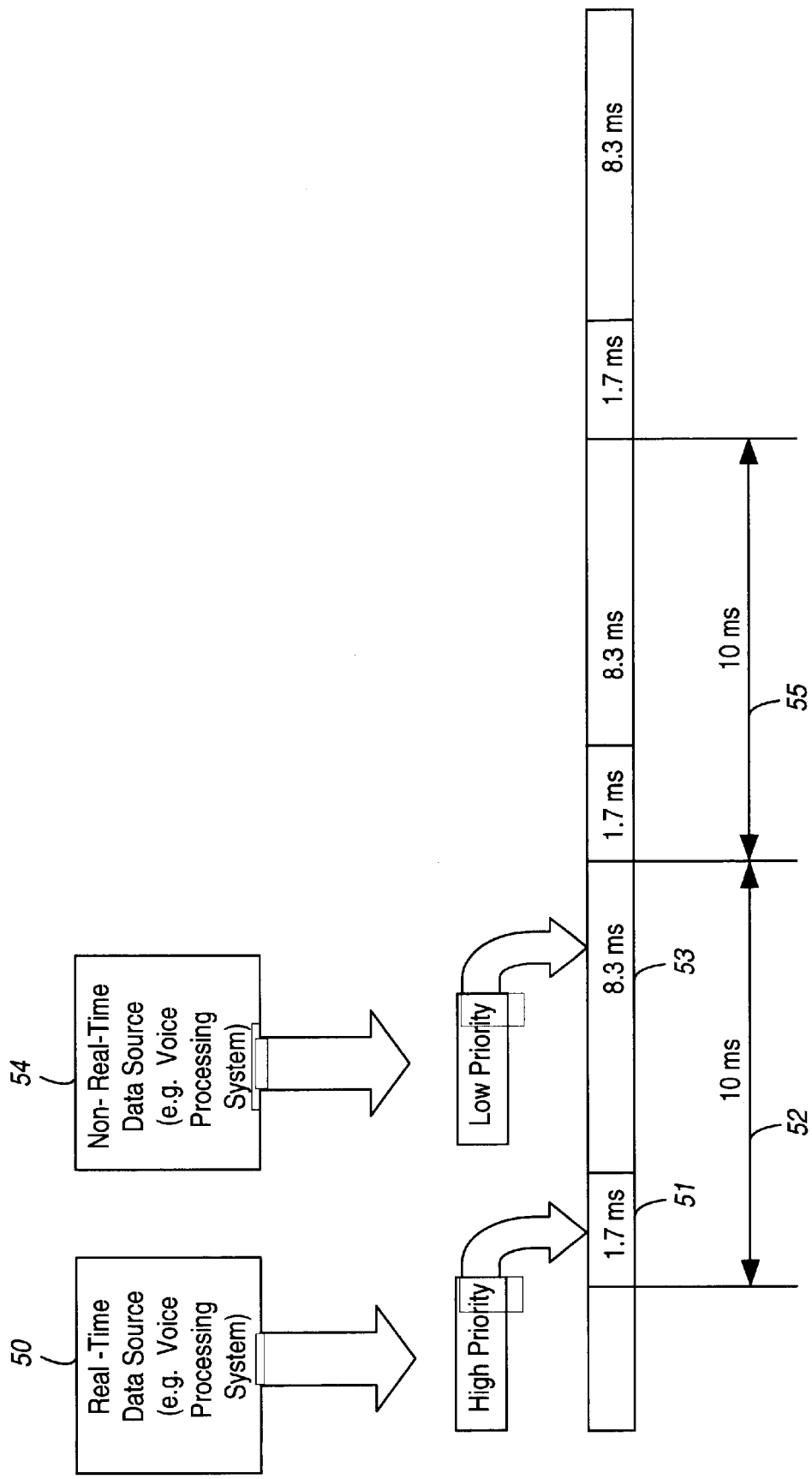
FIG. 3 illustrates the process of filling a mixed data unit with real-time and non-real-time data in accordance with this invention.

FIG. 3 illustrates the example of a network with a bandwidth of 1 Mbit/s carrying ten active calls, each of which has a CDC of 1.0 (each call is utilising the full spectrum allocated to it). Each real time packet 50 contains the sampled data of 5 calls over a 20 ms timeframe, and one such packet is transmitted at the start of every 10 ms launch window. Assuming a sixteen-bit sample per call each real-time packet consumes 212 bytes and requires approximately a 1.7 ms real time window 51 of the 10 ms launch window 52. This allows at most 8.3 ms of the launch window for the non-real time data 54 to use. This 8.3 ms window is the non-real-time window 53. This is the manner which the system uses to transmit real time data 50 in the first portion of the launch window 51 and allows the use of the remaining launch window 53 available for other types of data packets 54.

Note that in this example, the available launch window on the link for non-real time traffic 54 is at most 8.3 ms or 1037 bytes (depending on the domain: seconds or bits) wide. In order to avoid introducing packet jitter and delay at the access network link, the non-real time traffic 54 must not interfere with the regularly scheduled transmission of real time traffic 50. To achieve this it will be necessary to fragment non-real time packets 54 that are too large to fit into the time remaining in the launch window on the link, or it may be necessary to suppress the transmission of a non-real time packet 54 until the next window 55 is available.

The Dynamic IP MTU algorithm determines the probable window size based on the number of active voiceband calls and densities. This transmission window (expressed in either milliseconds or bytes) is translated into the 'largest frame size' (expressed in bytes) and inserted into the IP Forward Table 43 under the MTU column. The IP Fragmenter 43 will fragment outgoing IP packets into just the right size to fill the available window without affecting voice launch times.

Due to the dynamic nature of the real time data, it is possible that there may be situations where the MTU listed in the Forward Table 43 is not current. The number of setup calls or the CDC may have changed but not enough to trigger a MTU recalculation. In cases such as this, the real-time launch window 51 is able to slide to accommodate packets that are larger than the current launch window size; The algorithm will quickly catch up to the new situation.

In the previous example a data stream composed of a mix of real time packets 50 and non-real time packets 54 is delivered to a destination gateway 5. At that gateway 5 the destination IP address of the packet is examined. If the address of a packet does not match the receiving gateway, the packet is sent towards its destination (7 or 8). If the packet does match the gateway routes it to the port designated by the addressing information. This decouples voice packets from the data stream. The voice packets are then decoded into an audio signal by a CODEC (not shown).

What is claimed is:

1. A communication system for interleaving non-real-time data (NRD) and real-time data (RTD), said RTD representing at least one of n analogue signals, each signal received from at least one of n calls, wherein n is an integer greater than 1, for transmission over a data network, having a predetermined network bandwith, said system comprising:

(a) a non-real-time queue for receiving the NRD;

(b) a real-time queue for receiving the RTD;

(c) a network interface responsive to the non-real-time queue and the real-time queue for combining a maximum transmission unit (MTU) that contains a segment of the NRD, with a real-time window (RTW) that contains a segment of the RTD, into a launch window having a predetermined launch interval; and (d) MTU calculation means for determining a permissible size in bits for the MTU equal to at most the launch window size minus a size for the RTW suitable to permit a synchronized transmission of said RTD within the launch interval based on the network bandwidth.

2. A communication system as in claim 1, further comprising fragmentation means responsive to the MTU calculation means for fragmenting the NRD into a plurality of data fragments, each fragment having a size suitable for fitting within one of a corresponding plurality of MTUs.

3. A communication system as in claim 1, wherein the launch window has a size in bits equal to the product of the launch interval in seconds and the network bandwidth in bits per second.

4. A communication system as in claim 1, wherein the RTW has a size in bits equal to a predetermined number of protocol overhead bits plus a product of n, a pre-selected call density coefficient and a pre-selected block size in bits.

5. A communication system as in claim 1, wherein each one of the n calls has a respective call density coefficient (CDC) and a respective block size, and wherein the RTW has a size in bits equal to a predetermined number of protocol overhead bits plus a sum of n products corresponding to the n call, each product obtained by multiplying the respective CDC and the respective block size in bits of each one of the n calls.

6. A communication system as in claim 1, wherein the at least one of the n calls carries a voice signal.

7. A communication system as in claim 1, wherein the at least one of the n calls carries a facsimile signal.

8. A communication system as in claim 1, wherein the at least one of the n calls carries a video signal.

9. A method of interleaving non-real-time data (NRD) with real-time data (RTD) representing analog signals from at least one of n calls, wherein n is an integer greater than 1, into a combined data stream, to be transmitted over a data network having a predetermined bandwidth, said method comprising the steps of:

(a) receiving and queuing the NRD;

(b) receiving and queuing the RTD;

(c) filling a segment of the RTD into a real-time window (RTW) to form a first part of a launch window having a pre-selected size and a predetermined launch interval, wherein the RTW has a size suitable to permit a synchronized transmission of the RTD t within the launch interval based on the network bandwidth; and (d) filling a segment of the NRD into a maximum transmission unit (MTU) to form a second part of the launch window, wherein the MTU has a size equal to at most the launch window size minus the RTW size.

10. An interleaving method as in claim 9, further comprising the step of fragmenting the NRD into a plurality of data fragments, each fragment having a size suitable for fitting within one of a corresponding plurality of MTUs.

11. An interleaving method as in claim 9, wherein the launch window has a size in bits equal to the product of the launch interval in seconds and the network bandwidth in bits per second.

12. An interleaving method as in claim 9, wherein the RTW has a size in bits equal to a predetermined number of protocol overhead bits plus a product of n, a pre-selected call density coefficient and a pre-selected block size in bits.

13. An interleaving method as in claim 9, wherein each one of the n calls has a respective call density coefficient (CDC) and a respective block size, and wherein the RTW has a size in bits equal to a predetermined number of protocol overhead bits plus a sum of n products corresponding to the n call, each product obtained by multiplying the respective CDC and the respective block size in bits of each one of the n calls.

14. An interleaving method as in claim 9, wherein the at least one of the n calls carries a voice signal.

15. An interleaving method as in claim 9, wherein the at least one of the n calls carries a facsimile signal.

16. An interleaving method as in claim 9, wherein the at least one of the n calls carries a video signal.

* * * * *